United States Patent [19]

Simon et al.

[11] Patent Number: 5,203,109
[45] Date of Patent: Apr. 20, 1993

[54] APPARATUS FOR TRANSPLANT PROPAGATION

[75] Inventors: Edward J. Simon, 1015A Greenwood Rd., Elk, Calif. 95432; Anthony Visser, s-Gravendeel, Netherlands

[73] Assignee: Edward John Simon, Elk, Calif.

[21] Appl. No.: 815,288

[22] Filed: Dec. 27, 1991

Related U.S. Application Data

[63] Continuation-in-part of Ser. No. 803,685, Dec. 3, 1991, abandoned, which is a continuation of Ser. No. 549,454, Jul. 6, 1990, abandoned, and a continuation-in-part of Ser. No. 104,661, Oct. 5, 1987, Pat. No. Des. 312,577.

[51] Int. Cl.$^5$ .............................................. A01G 9/10
[52] U.S. Cl. ......................................... 47/75; 47/66; 47/86
[58] Field of Search .................. 47/75, 73, 79, 59, 66, 47/86, 87

[56] References Cited

U.S. PATENT DOCUMENTS

| | | |
|---|---|---|
| 3,524,419 | 8/1970 | Middleton et al. |
| 3,561,158 | 2/1971 | Marcan |
| 3,722,137 | 3/1973 | Kesinger et al. |
| 3,849,932 | 11/1974 | Adams |
| 4,014,135 | 3/1977 | Greenbaum |
| 4,167,911 | 9/1979 | Masuda et al. |
| 4,178,715 | 12/1979 | Greenbaum |
| 4,242,834 | 1/1981 | Olsen |
| 4,250,663 | 2/1981 | Merrit |
| 4,291,499 | 9/1981 | Prewer |
| 4,395,846 | 8/1983 | Gjertz et al. |

FOREIGN PATENT DOCUMENTS

| | | |
|---|---|---|
| 0030873 | 6/1981 | European Pat. Off. |
| 0213420 | 3/1987 | European Pat. Off. |
| 2536114 | 1/1976 | Fed. Rep. of Germany |
| WO8910683 | 11/1989 | PCT Int'l Appl. |
| 1384981 | 2/1975 | United Kingdom |
| 2088186 | 6/1982 | United Kingdom |

Primary Examiner—David A. Scherbel
Assistant Examiner—Joanne C. Downs
Attorney, Agent, or Firm—Lowell C. Bergstedt

[57] ABSTRACT

Apparatus for transplant propagation comprising a unitary lower tray-forming member and a separate unitary upper tray-forming member carried on lower tray-forming member and cooperatively forming a regular array of transplant plug cells for containing a transplant medium for growing of seedlings. In one embodiment, the upper tray-forming member is removable from the lower tray-forming member and carriers transplant plugs out of the array of cells. In another embodiment, the upper tray-forming member is removable from the lower tray-forming member and leaves the transplant plugs in place on the lower tray-forming member to be carried thereby.

28 Claims, 7 Drawing Sheets

APPARATUS FOR TRANSPLANT PROPAGATION

CROSS-REFERENCE TO RELATED APPLICATIONS

This application is a continuation-in-part of copending and commonly assigned U.S. patent application Ser. No. 07/803,685, filed Dec. 3, 1991, which is a file wrapper continuation of U.S. patent application Ser. No. 07/549,454, filed Jul. 6, 1990 (now abandoned) and a continuation-in-part of Ser. No. 07/104,661 filed Oct. 5, 1987 now U.S. Design Pat. No. D312,577. This application is also a continuation-in-part of Patent Cooperation Treaty application No. PCT/US91/04661 filed on Jul. 5, 1991, which PCT application also claims priority of prior U.S. patent application Ser. No. 07/549,454, filed Jul. 6, 1990.

FIELD OF THE INVENTION

This invention relates generally to apparatus for propagation of transplants or seedlings in multicell trays and specifically to structure of transplant propagation trays and apparatus for automating lug removal from trays.

BACKGROUND OF THE INVENTION

Figures 1, 2, 3, 4, 5:
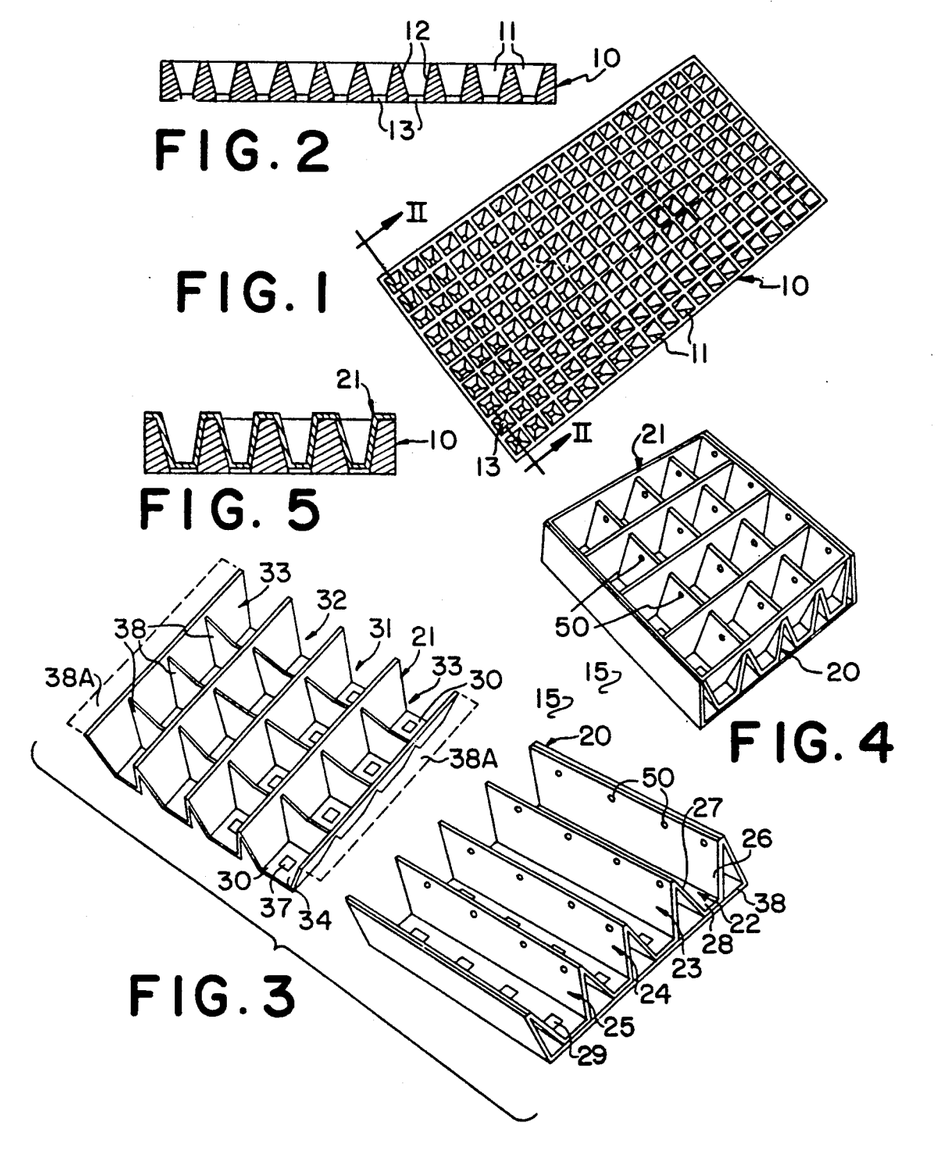
FIGS. 1 and 2 illustrate prior art "Speedling" type transplant propagation trays, with FIG. 2 being a section view taken along the lines 2—2 in FIG. 1.
FIG. 3 is a perspective view of one embodiment of upper and lower tray members forming, when assembled, an overall transplant propagation tray in accordance with this invention.
FIG. 4 is a perspective view of a transplant propagation tray in accordance with this invention.
FIG. 5 is a section view illustrating an alternative embodiment of transplant propagation apparatus in accordance with this invention.

The state of the art in seedling transplant propagation involves the use of a large tray having a rectangular array of individual cells for containing a transplant medium into which individual seeds or root cuttings are placed and grown under greenhouse conditions. Currently this large tray most often comprises a molded Styrofoam plastic tray such as is illustrated in FIGS. 1 and 2 of the drawings and is sold under the trade mark "Speedling." Other have proposed many different forms of transplant propagation trays such as, for example, the ones taught and illustrated in U.S. Pat. Nos. 4,769,946, 4,658,542, 4,495,725, 4,242,834, and 3,386,608.

In some countries, such as the Netherlands, the technology of transplant propagation has become quite sophisticated and mechanized. Apparatus has been constructed with various machine stages for dropping soil into the cells in the tray, brushing off excess soil, forming an indentation for the seed hole, dropping seeds into each seed hole in each cell, spreading vermiculite or other mulching over the dirt, and watering the plug. For example, U.S. Pat. No. 4,221,175 illustrates a machine for dropping seeds into individual cells of a multicell tray.

Several disadvantages are involved in the use of the Speedling type of instant propagation tray and many of the other types of tray that have been proposed. The trays typically dont't last more than several growing seasons over a two or three year period. Toward the end of their useful life, the Speedling trays tend to deteriorate with the surfaces of the cell walls getting rougher and making it more difficult to remove the transplant plug from the tray. The trays are bulky and thus difficult to and costly to ship from the nursery to the planting location. Cleaning of the trays after use can be difficult since the side walls of the main individual cells are not readily accessible to brushing. Storage of the bulky trays when not in use consumes a lot of space. Disposal of the Styrofoam plastic trays may create environmental problems.

OBJECTS OF THE INVENTION

Accordingly, it is the principal object of this invention to provide an improved transplant propagation tray.

It is a further object of this invention to provide a transplant propagation tray which is more cost effective in initial purchase cost and longevity of use.

It is a further object of this invention to provide a transplant propagation tray that provides ease of removal of transplant plugs from the tray.

It is a further object of this invention to provide a transplant propagation tray in which one or more components thereof can optionally be formed from inexpensive materials to be disposable or from more expensive, rugged materials to last for many years.

It is a further object of this invention to provide a transplant propagation tray with a removable upper tray member which carries the transplant plugs and which, after being emptied, nests with other similar tray members for convenient, low cost shipping back to the nursery.

It is another object of this invention to provide a transplant propagation system with integrated soil heating and/or watering features.

It is another object of this invention to provide a transplant propagation system with automated plug removal for convenience of interfacing to automatic plug transplanting apparatus.

FEATURES AND ADVANTAGES OF THE INVENTION

In its broadest aspect, this invention features apparatus for transplant seedling propagation comprising a lower tray-forming member and a separate upper tray-forming member carried in removably mated relationships on the lower tray-forming member so as to form a complete seedling propagation tray. Each of the lower tray-forming member and the upper tray-forming member have a plurality of rows of partial cell-forming wall structures adapted to mate together and thereby combining together to form the completed walls of a regular two-dimensional array of separate cells for containing transplant plugs. Each of these separate cells is adapted to be filled with a transplant propagation medium for growing a seedling from a seed deposited therein, thereby forming a transplant plug. The separate upper tray-forming member is separable from the lower tray-forming member after the seedlings are grown in the transplant plugs in the tray such that each and every one of the transplant plugs is thereafter carried solely on a prearranged one of the upper tray-forming member and the lower tray-forming member and supported only by the partial cell forming wall structures thereof. In this manner all of the transplant plugs may thereafter be easily removed from the associated tray-forming member for transplanting.

In one embodiment, the upper and lower tray-forming members are each tray members with partial cell-forming wall structures and the upper tray member has both side and bottom wall structures in each cell location so as to comprise the tray-forming member which carries the transplant plugs out of the tray. In another embodiment, the upper tray-forming member has only side wall structures which cooperate with side and bottom wall structures of the lower tray-forming member to form an array of complete cells for holding transplant plugs. In this second embodiment, the separation of the upper tray-forming member from the lower tray-forming member leaves the transplant plugs supported and carried on the lower tray-forming member.

One of the advantage of this second embodiment is that the side and bottom walls of the lower tray-forming member, i.e. the one carrying the transplant plugs, may be continuous so there are no open places with the potential of disturbing the structural integrity of the plug. Furthermore, the transplant plug walls formed by the upper tray-forming member may be vertical so that the row of plugs are easily pushed out of the lower member without tending to disturb the propagation medium comprising the plug. Another advantage is that both upper and lower tray-forming members may be constructed such that they are stackable for shipping back from the field.

In the case of both embodiments, in some instances it may be feasible to ship only the tray-forming member which carries the plugs from the greenhouse to the fields, thus saving on weight and avoiding the need to return the other tray-forming member from the field.

Another aspect of the invention features apparatus for transplant propagation comprising a lower tray member and an upper tray member carried on the lower tray member and cooperatively forming a two dimensional array of transplant plug cells for containing a transplant medium for growing of seedlings, the upper tray member being removable from the lower tray member to carry transplant plugs out of the array of cells.

In one embodiment of the lower tray member comprises a transplant propagation tray (e.g. a Speedling tray) itself defining a rectangular array of transplant plug cells, and the upper tray member comprises a plurality of separate parallel channels each having vertical side wall sections and joining bottom wall sections with openings in the side and bottom wall sections adapted to a low the upper tray member to nest in the lower tray member and form portions of the side and bottom walls of the transplant plug cells.

Thus the upper tray member of this invention can be formed to work cooperatively with a Speedling tray and facilitate removal of transplant plugs therefrom. It can serve to extend the life of such trays after they have begun to degrade to the point that they would otherwise be candidates for disposal.

In a preferred embodiment, the upper and lower tray members each comprises a plurality of parallel channels with each channel formed by a pair of opposite vertical side wall sections and a bottom wall section joining lower edges of the vertical side wall sections. Adjacent vertical side wall sections of the tray members are joined together and form a substantially structural element. The channels in the lower and upper tray members are positioned transverse to each other when assembled together. The channels in the lower tray member are substantially continuous from end to end thereof. The vertical side wall sections and bottom wall section of the upper tray member are discontinuous from end to end and define openings corresponding in geometrical shape to the structural element formed by vertical side wall sections of the lower tray member such that the upper tray member nests on the lower tray member and sections of the vertical side walls of both the upper and lower tray members form the overall complete side walls of the array of transplant plug cells.

The bottom wall section of the upper tray member may be positioned substantially adjacent to the bottom wall section of the lower tray when the tray members are assembled together and both of the bottom wall sections may have apertures defined therein at cooperative locations to form a drainage aperture in the bottom of each of the transplant plug cells.

Another embodiment of this features a lower tray member in which a plurality of water transmission channels are formed between adjacent vertical side walls and extend from one end of the lower tray member to the other end thereof. The overall apparatus further includes a first header mounted in a liquid sealed relationship over one end of the lower tray member to permit water flow between the ends of the water transmission channels thereat. A second header means is mounted in a liquid sealed relation over the opposite end of the lower tray member to permit water flow between the ends of the water transmission channels thereat. A heater means is mounted in one of the headers, and a temperature sensor and a control arrangement is provided for operating the heater means to control the temperature of water in the first and second header means and the water transmission channels.

This embodiment offers the advantage of direct heating of the soil of the transplant plugs and avoids the need for expensive greenhouse enclosures.

In another embodiment of this invention, the water transmission channels are combined with a plurality of water emitter means for communicating water through the side walls of the channels in the lower tray member to water the transplant plugs carried in each of the cells.

Another aspect of this invention features transplant propagation and planting apparatus which utilizes a plurality of transplant propagation trays each comprising a lower tray member and an upper tray member carrie on the lower tray member and cooperatively forming a regular array of transplant plug cells for containing a transplant medium for growing of seedlings. The upper tray member is removable from the lower tray member to carry transplant plugs out of the array of cells. This embodiment further includes a tray conveyer module, including a tray conveyer for receiving a sequence of the upper tray members carrying mature transplant plugs and carrying each of the upper tray members to a plug transfer station. A plug removal means is provided for removing the transplant plugs from the upper tray member one row at a time at the plug transfer station. A plug transfer module is positioned at the plug transfer station and is adapted to receive each row of transplant plugs at a plug transfer location and to carry each of the transplant plugs to a plug delivery location, the plug delivery location being readily interfaced to a plug planting module of an automatic transplant machine.

Another aspect of this invention features transplant propagation and planting apparatus which handles a plurality of transplant propagation trays one at a time in sequence. Each tray comprises a unitary lower tray member and a separate unitary upper tray member carried on the lower tray member and cooperatively forming a regular array of transplant plug cells for containing a transplant medium for growing of seedlings, the unitary upper tray member being removable from the unitary lower tray member to carry transplant plugs out of the array of cells. A transplant plug conveyer is provided for carrying individual ones of the transplant plugs away from a plug transfer station. A plug removal module positioned at the plug transfer station and comprises first support means for supporting the upper tray member in a fixed position adjacent the transplant plug conveyer and independent of support of the lower tray member, second support means for supporting the lower tray member in a vertically movable relation to the upper tray member and including means for moving the lower tray member from an initial position in which the lower tray member is nested with the upper tray member to a separated position in which the lower tray member is fully separated from transplant plugs supported on the upper tray member; and plug pusher means adapted to be selectively positioned adjacent each row of transplant plugs carried on the upper tray member and having a pusher element operative to push the transplant plugs in the row one at a time onto the transplant plug conveyer.

From the above features it will be apparent that the transplant propagation tray of this invention provides many advantages over prior art trays. The tray members of this invention can alternatively be made from inexpensive materials for one time use and disposal or from more rugged materials to last many years more than the prior art trays. The upper tray member, being removable from the lower tray member, facilitates both the removal of transplant plugs and the carrying of the plugs to the location of final use. Thereafter, depending on the form of the transplant propagation tray, this upper tray member may be easily and inexpensively shipped back to the nursery by nesting it with other members and placing them in a shipping container. Both nesting and non-nesting versions of the upper tray member are disclosed herein.

The transplant propagation apparatus of this invention can readily be adapted to use with the mechanized operations of large scale growers and can also be adapted to use in small greenhouse and home transplant propagation operations.

Other objects, features and advantages of this invention will be apparent from the following detailed description of various embodiments taken in conjunction with the accompanying drawings.

DETAILED DESCRIPTION OF INVENTION EMBODIMENTS

A central feature of this invention can be seen by considering the various embodiments shown in FIG. 3, 4 and 14, FIGS. 11-13, FIG. 15, and FIGS. 16 and 17. That feature is that a transplant propagation tray apparatus in accordance with this invention comprises the combination of an upper tray-forming member and a lower tray forming member, each having rows of partial cell-forming wall structures, which mate together to form an array of completed cells for holding transplant propagation plugs. After the transplant plugs have been formed and the seedling grown therein, in each embodiment, the upper tray-forming member is separated from the lower tray-forming member. Then, depending on the particular embodiment, either the upper tray-forming member (e.g. the embodiment of FIGS. 3, 4 and 14) or the lower tray forming member (e.g. the embodiment of FIGS. 16 and 17) becomes the sole support for carrying the array of transplant plugs for transplanting. Thus the plugs are easily removed from the member carrying them and a variety of manual or automated plug removing apparatus and methods may be employed.

Referring now to FIGS. 3 and 4, it will be seen that transplant propagation apparatus 15 comprises a lower tray member 20 and an upper tray member 21 which, when assembled together, cooperatively form a rectangular array of transplant plug cells as shown in FIG. 4. The four by four array shown in these figures is used for purposes of example only, and it will be appreciated that the tray members 20 and 21 can be formed to provide as large or small an array of cells as desired. The size and shape of individual cells can be varied as well so that the invention is readily adapted to use for propagating small seedlings for flowers or fruits and vegetables or larger seedlings for trees to be used in reforestation projects. Various manufacturing methods and materials are discussed below.

Figure 11:
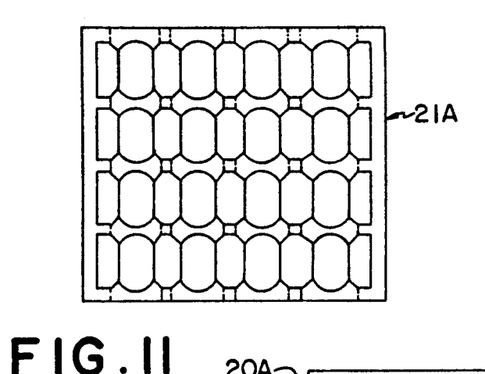
FIGS. 11 and 12 are top views of an upper tray member and a lower tray member, respectively, comprising an alternative embodiment of transplant propagation apparatus in accordance with this invention.
Figure 12:
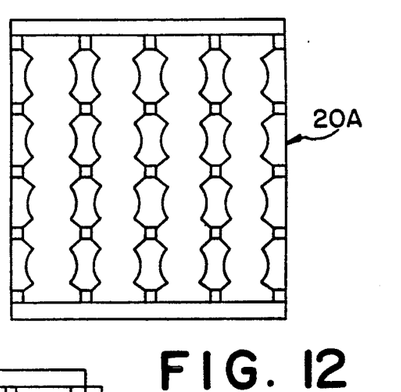

FIGS. 3-7 illustrate an embodiment of the invention in the form of an array of rectangular (special case being square) cells with sloping vertical side walls. FIGS. 11 and 12 illustrate an alternative embodiment in the form of an array of cells with circular cross sections and straight vertical side walls. It should be apparent that other regular geometric shapes for the cross section of the cells, such as a hexagon, could also be used if desired. Tray members with sloping vertical wall configurations will stack together in a nesting manner, while tray members with straight vertical side walls will not stack in a nesting fashion.

Figure 15:
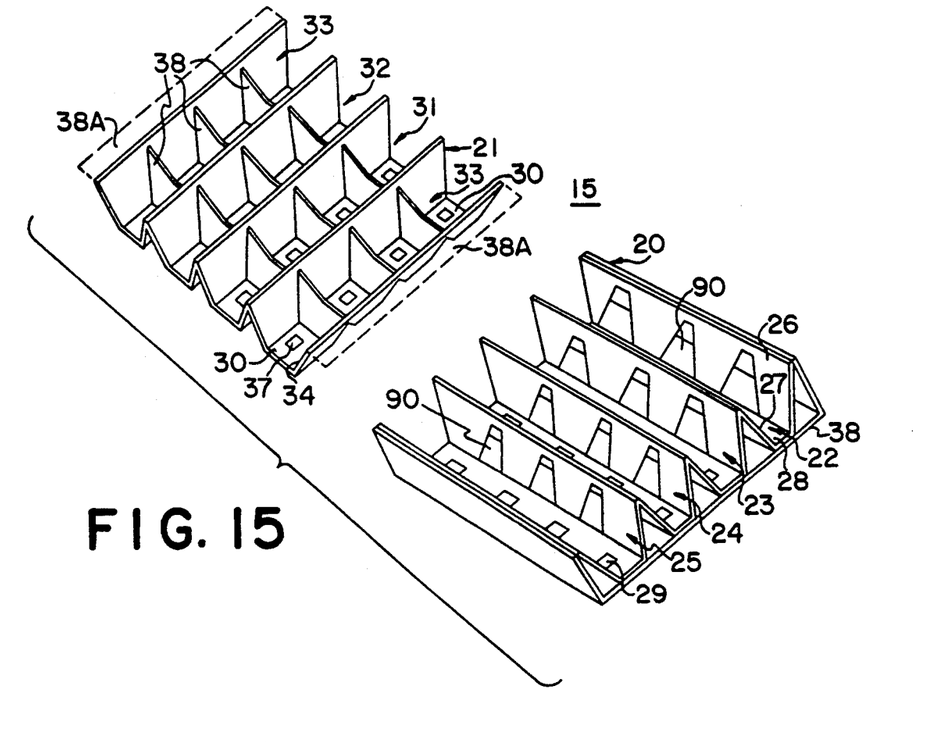
FIG. 15 illustrates a further alternate embodiment of a transplant propagation tray with a modified lower tray member.

FIG. 15 illustrates another alternative embodiment in which side wall portions 26 of lower tray member 20 have openings 90 formed therein as shown. Openings 90 are positioned and shaped such that when upper tray member 21 is nested therein, the openings 90 are hidden behind wall sections 33 and 34 of each of the channels of the upper tray member. These openings lower the weight of the lower tray member and also reduce the amount of material used in forming that part of the transplant propagation tray.

Lower tray member 29 comprises a plurality of channels 22-25, each of which is formed from sloping vertical side walls 26,27 and a bottom wall 28 joining the lower edges of the sidewalls. The tops of adjacent side walls are joined and form a rectangular shaped structural element between channels. Apertures 29 which may be any geometric shape such as square or round are formed in bottom walls 28 of each channel in positions which substantially align with corresponding apertures 37 in the channels of the upper tray 21.

Upper tray member 21 comprises a plurality of channels 30-33 which are discontinuous due to the triangular openings 38 formed in sloping vertical side walls 35,35. Bottom wall sections 36 are also discontinuous and this arrangement provides for upper tray member 21 to nest in lower tray member 20 to form the overall multiple tray 15 shown in FIG. 4.

Upper tray member 21 may be formed with a pair of end flanges 38A thereon to assist in gripping this member for separating it from the lower tray member 20 after transplant plugs grown therein have matured. If desired, buttresses or other structural elements could be formed between the adjacent sloping wall sections to provide more structural rigidity to this member.

It will be appreciated that propagation tray 15 can be made to have essentially the same overall shape and configuration of the Speedling tray shown in FIG. 1. After tray 15 is assembled, dirt may be dispensed into the individual cells and each cell may be seeded by hand or machine. After the seedlings have grown to the desired size, removal of the individual plugs for transplanting is facilitated by either lifting or sliding upper tray member 21 out of lower tray member 20. The array of plugs carried on the upper tray member may then be placed in an inexpensive disposable box for shipping to the final planting site. After transplanting is completed, the upper tray member 21 can be nested with other similar upper tray members for convenient return shipping to the nursery, if constructed of durable material for long term use. Otherwise, if made from inexpensive materials, they may be nested together for transplanting to a disposal site or a plastic reprocessing location.

FIG. 5 illustrates another embodiment of this invention in which upper tray member 21 is formed to conform with the cell size and distribution of a Speedling type tray 10 which forms the lower tray member of the over combination propagation tray. With upper tray member 21 used as a nestable insert, removal of the transplant plugs is facilitated. In addition, the useful life of the tray 10 may be extended by this combination since upper tray member 21 would enable use of trays 10 which otherwise have degraded, such as having cell walls deteriorated to the point of making plug removal difficult without breaking the root ball.

Figure 6:
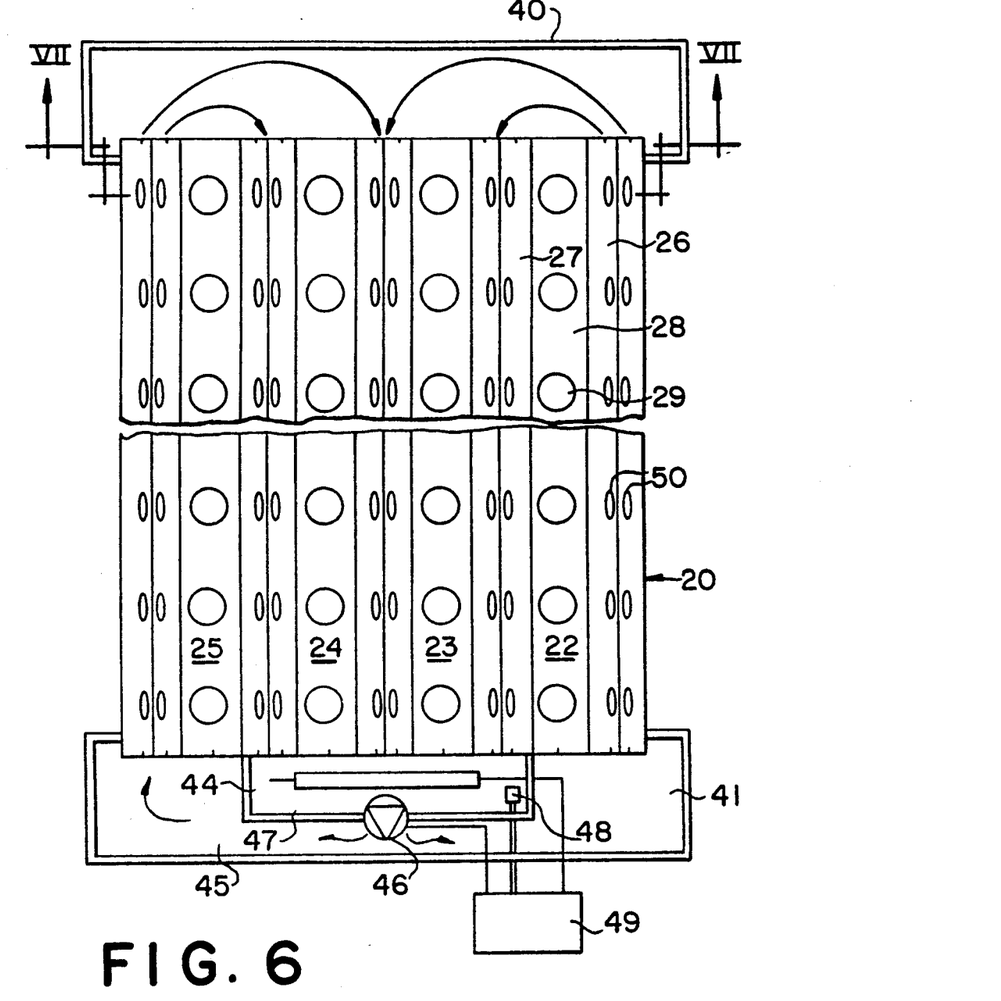
FIGS. 6 and 7 illustrate another embodiment of transplant propagation apparatus in accordance with this invention and having a built in plug heating feature, with FIG. 7 being a schematic section view taken along the lines 7—7 in FIG. 6.
Figure 7:
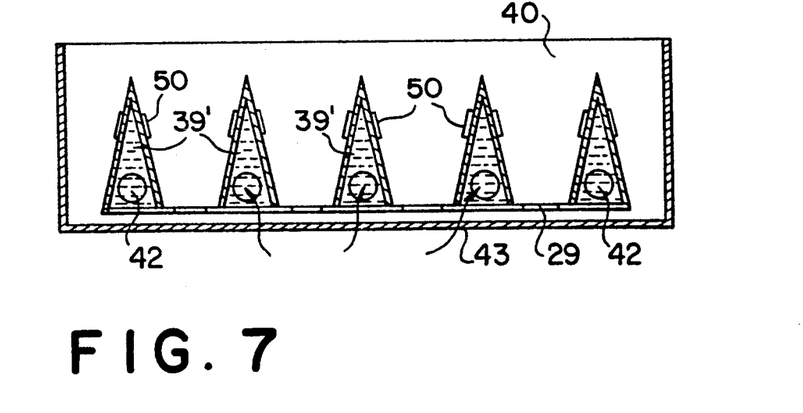

As shown in FIG. 3, a separate bottom plate 38 may be attached to the lower tray member 20 to provide structural rigidity thereto. Plate 38 may be sealed to the bottom of tray member 20 such that individual water transmission channels 39 are provided in the enclosed triangular regions thereby produced. Alternatively, water transmission channels could be provided by separate conduits extending through these triangular regions. A lower tray member 20 of this type provides the basis for a transplant plug heating system as shown in FIGS. 6 and 7. In addition, an arrangement of water emitters 50, e.g. in the form of pinholes, can be provided in the side walls of bottom tray member 20 to deliver water to the individual cells in tray 15. Preferably the emitters are positioned where they are covered by the upper tray member to avoid clogging by the dirt in the individual cells.

In the embodiment shown in FIGS. 6 and 7, headers 40 and 41 are mounted in a water tight manner on opposite ends of lower tray member 20. Individual access ports 42 and 43 communicate between headers 40 and 41 and water transmission channels 39.

A submersible electric heating coil 47, temperature probe 48 and control system 49 provide thermostatically controlled water temperature in header 41. While thermal induced currents in the headers 40,41 and the water transmissions channels 39 may be employed to communicate the water warmed by heater coil 47 to all parts of the system, it is preferable to form header 41 with a first header compartment 44 and a second header compartment 45 with a water pump 46 used to pump water from compartment 44 to compartment 45 for forced water circulation through the system.

It should be apparent that there are many approaches that could be taken to integrating the apparatus of this invention into the operation of a large scale commercial transplant propagation operation.

Figure 8:
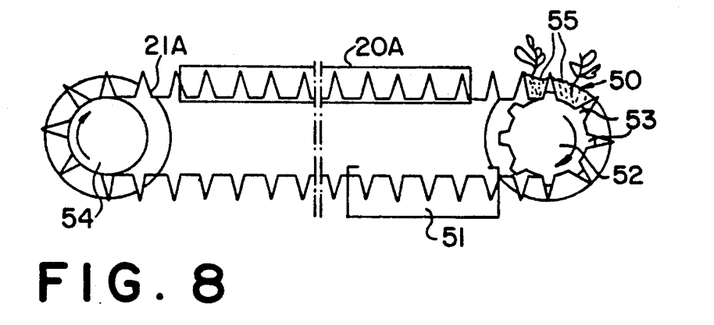
FIG. 8 illustrates another embodiment of this invention adapted for large scale commercial transplant propagation systems.

FIG. 8 illustrates an embodiment of this invention for use in large scale commercial seedling nurseries. A lower tray member 20A having similar structure to that shown in FIG. 3 is mounted in a fixed position. The channels of lower tray member 20A extend from left to right parallel to the plane of the paper and may be many feet long. Preferably lower tray member would be formed of heavy gage structural plastic or sheet metal for strength and durability. Upper tray member 21A is made in the form of a continuous belt which is carried on guide rolls 52 and 54. It would preferably be formed from a strong flexible material such as rubber or vinyl. Guide roll 52 may have an arrangement of driving teeth 53 and be coupled to a drive motor (not shown).

Various machine stages for dispensing dirt, creating seed depressions, dropping seeds, and adding mulch may be mounted in operative relation to the traveling upper tray member 21A to automate these operations in a manner similar to current state of the art practice. After seedlings have grown to desired size, upper tray member 21A may be driven to bring each row of the transplant plugs 55 to a plug unloading station 50. On the underside, a tray cleaning station 51 may be provide for brushing and/or spraying residual dirt and debris from the lower tray belt.

Figure 9:
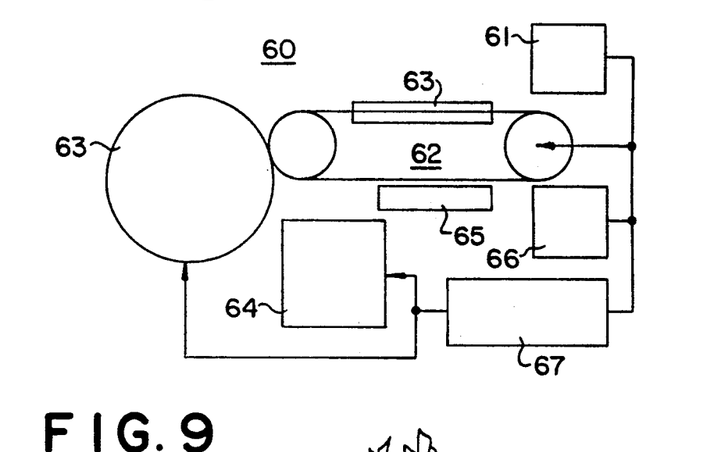
FIGS. 9 and 10 illustrate a transplant propagation and planting system which interfaces the transplant plug tray of this invention with automatic transplanting machinery.
Figure 10:
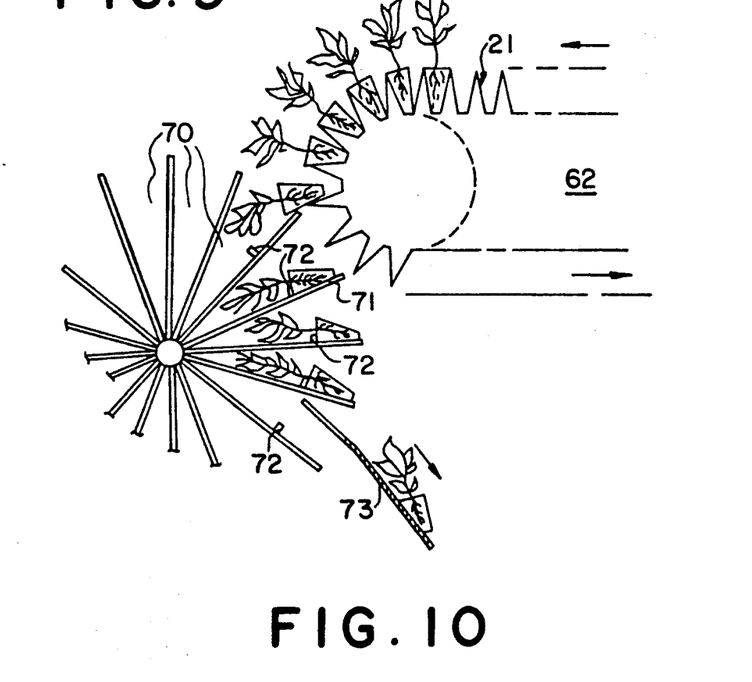

Referring now to FIGS. 9 and 10, an approach to interfacing the transplant tray apparatus of this invention into an overall automated plug planting system 60 will be described. A full tray loading module 61 carries a large number of upper tray members 21 and sequentially places them on a tray conveyer 62 which grips the upper tray members and carries them to a transfer point on the other end of the conveyer 62. An upper tray member guide 68 is located in a fixed position relative to the tray conveyer 62 to guide the individual plugs in the upper tray module as they slide along. This avoids any dislodging of the plugs as they are transported. Various approaches could be taken to gripping and conveying the upper tray members using various conveyer mechanisms.

A plug transfer module 63 accepts rows of plugs leaving the upper tray members as they are unloaded and transfers these plugs to a plug planting module 64. The emptied tray members may then be passed through a tray cleaning station 65, followed by unloading then in sequence from the belt using an empty tray unloading module 66. Overall operation of this system may utilize a system controller 67.

FIG. 10 illustrates one embodiment of a plug transfer module 63. Individual upper tray members 21 are carried on tray converter 62 around a guide roll so that the individual cells are spread at the top and rows of plugs will be dislodged from the upper tray member and drop onto plug receiving fingers 71 in separate bins 70. A plug stop 72 holds the individual plugs in position on the fingers in each bin. Fingers 71 and bins 70 rotate synchronously with the transport of the upper tray member. Plugs are transferred from the point at which they are received to a plug delivery chute 73 leading to a plug planting module 64.

It will be appreciated that there are many alternative approaches that could be used for conveying the upper tray members and for transferring the plugs from a upper tray member to automated plug planting apparatus.

Figure 14:
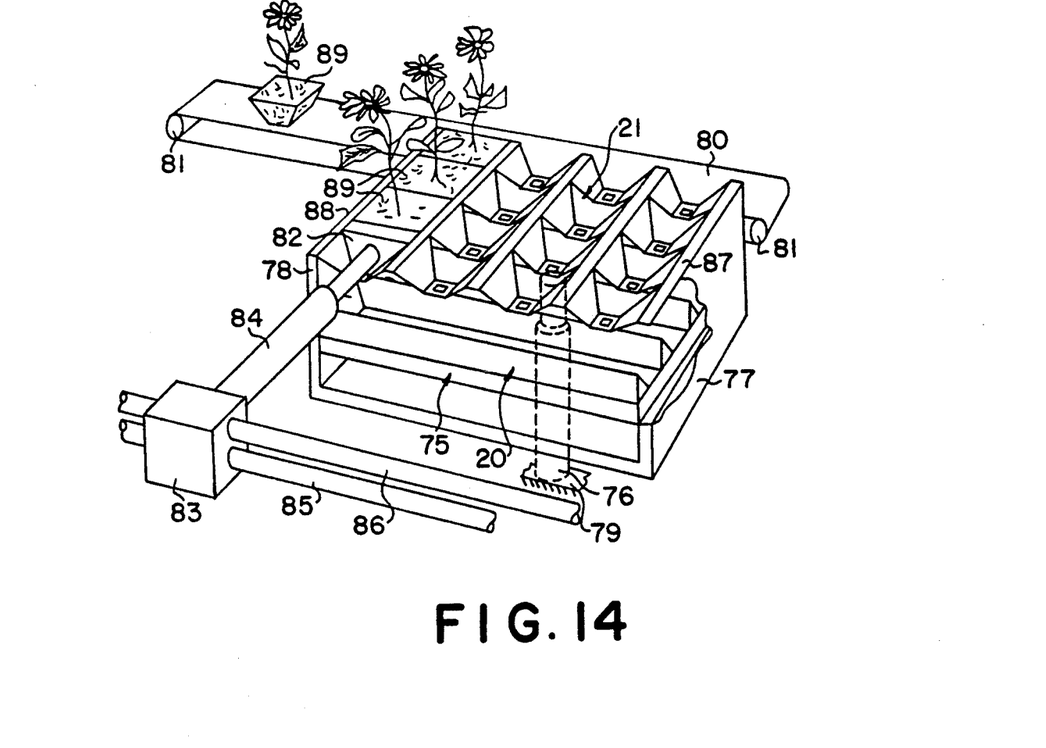
FIG. 14 illustrate an embodiment of a transplant plug removal and conveyer apparatus in accordance with this invention.

In addition, there are many alternative types of apparatus which may be utilized for removing transplant plugs from individual trays. For example, FIG. 14 illustrates apparatus for handling individual trays in a manner in which the upper tray member 21 is independently supported on side support walls 77, 78 of a support means and lower tray member 20 is supported on a platform 75 which is mounted for vertical movement between an initial position in which the lower tray member is nested with the upper tray member to a separated position in which the lower tray member is fully separated from the upper tray member and the transplant plugs now supported solely on the upper tray member.

An actuator 76 which may be in the form of a hydraulic cylinder provides the means for moving the platform on which the lower tray member is carried. The actuator and the support walls 77,78 are all carried on and supported relative to a base plate 79 by means not shown in the figure but apparent to those of skill in the art of making this type of apparatus.

A conveyor belt 80, carried on and driven by one or more of the rollers 81, is disposed adjacent the plug transfer station formed by the support frame and platform arrangement described above. Belt 80 is operated to carry individual transplant plugs 89 to a planting station (not shown). The position of the upper belt portion of the conveyer 80 is such that it is just slightly below the bottom wall elements of the upper tray member 21 so that plugs carried thereon can easily be pushed onto the conveyer.

A plug pusher arrangement is provided for pushing transplant plugs 89 off of upper tray member 21 one row at a time. A pushing element 82 is carried on and advanced by an actuator 84 which may comprise a hydraulic cylinder. Actuator 84 is in turn carried on a carriage 83 which is movable on a pair of guiding rails 85, 86 which extend parallel to conveyer belt 80 on the opposite side of the tray support arrangement. Carriage 83 may be driven by an actuator or other form of driving mechanism such as an endless belt drive connected to and driven by an electric motor (not shown).

Operation of this plug transfer arrangement will now be described. A nested combination of upper tray member 21 and lower tray member 20 with an array of transplant plugs 89 therein is brought to the unloading station and placed in the unloading apparatus with the lower tray member 20 supported on platform 75 which is at that time positioned in its initial upper position to support the lower tray member in a nested relation to the upper tray member. The edge lips or rims 87 of upper tray member are supported on the top edge of support side walls 77, 78. A clamping means (not shown) may be provided to hold rims 87 on the support walls or alternatively an arrangement of pins (not shown) may be carried on the top edge of side walls 77, 78 to cooperate with apertures (not shown) in rims 87 to hold the upper tray member 21 on the support arrangement.

Platform 75 may then be lowered by operation of actuator 76 until lower tray member 20 is completely separated from upper tray member 21 and the transplant plugs 89 carried now solely on upper tray member 21. Carriage 83 is then positioned such that actuator 84 and pushing element 82 are aligned with one of the rows of the upper tray member 21 and the actuator 84 is then operated to push that row of transplant plugs 89 onto conveyer belt 80. Carriage 83 is sequentially aligned with each row and the plugs in each row are pushed sequentially onto conveyer 80.

It should be apparent that the operation of this apparatus can be readily controlled by an automatic electronic controller interfaced to the conveyer 80 and its drive mechanism (not shown), to actuators 76 and 84, and to a carriage drive (not shown) for fully automated operation after a tray has been loaded into the transfer apparatus. It should also be apparent that further equipment could be added for automatically carrying full transplant propagation trays to the plug transfer station shown in FIG. 14 and for carrying empty trays away from the plug transfer station.

Figure 16:
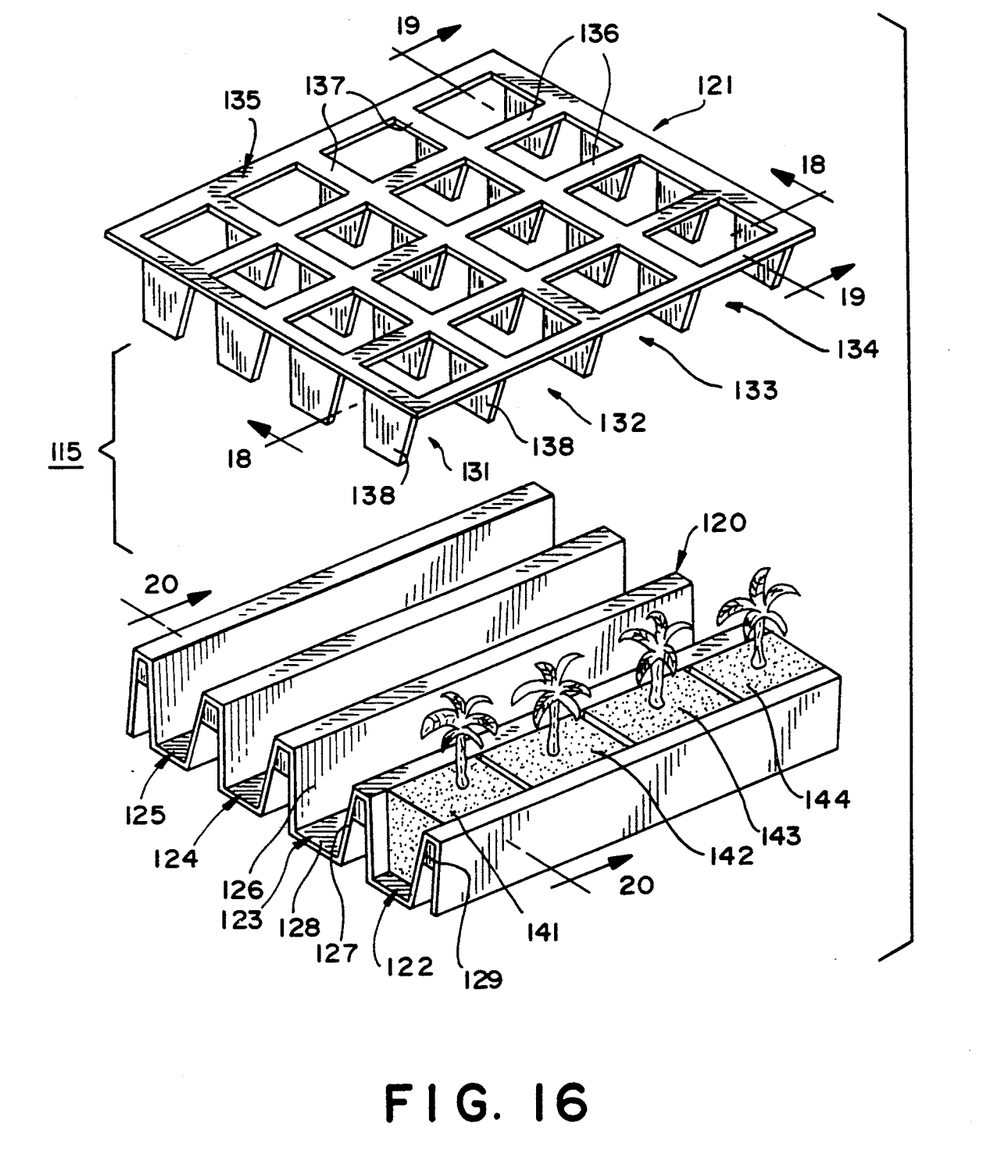
FIG. 16 is an exploded view of another alternate embodiment of a transplant propagation tray apparatus including upper and lower tray-forming members in accordance with this invention.
Figure 17:
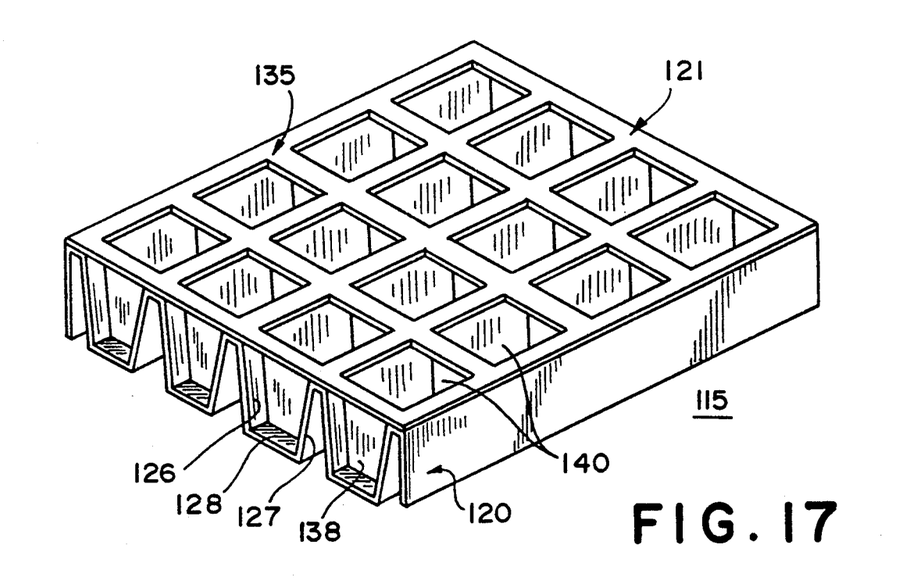
FIG. 17 is an isometric view of an assembled transplant propagation tray unit according to the embodiment of FIG. 16.

Referring now to FIGS. 16-20, another embodiment of this invention will be described. In this embodiment apparatus for transplant seedling propagation comprises a multicell tray 115 which is formed by mating together a lower tray-forming member 120 and an upper tray forming member 121. FIG. 16 shows the lower tray-forming member 120 and upper tray-forming member 121 as separated units and FIG. 17 shows the two members mated together to form a completed multicell tray.

Each of the lower tray-forming member 120 and upper tray-forming member 121 have rows of partial cell-forming wall structures. In the case of lower tray-forming member 120, four rows of partial cell-forming wall structures 122-125 are shown, but it should be apparent that this is for illustration only and any convenient number of rows could be employed. Each row has a side two side walls 126, 127 and a bottom wall 128, all of which are continuous from one end of lower tray-forming member 120 to the other. Bottom wall 128 has a series of holes 130 therein to allow escape of excess water from the cells. It should be apparent that these water escape holes 130 could also be formed in other wall structures if desired.

Upper tray-forming member 121 has four rows 131-134, and each row is formed by opposing wall surfaces of the downwardly depending walls 138. It should be apparent that, instead of using a single vertical wall to provide the side wall portions of adjacent rows, two separate vertical walls could be employed. However, such a version of upper tray-forming member 121 with two side by side walls between cells would not be stackable as in the single wall version.

Upper tray-forming member 121 has an upper frame member 135 which includes a pattern of frame wall sections 136 and 137 extending orthogonal to each other. Depending on the size of the unit and the rigidity of the materials employed, the frame sections 136 on the interior of the frame might be eliminated since they are not required for supporting depending wall sections 138.

Lower tray-forming member 120 optionally includes partial wall bracing members 129 which may comprises a series of separated ones of such bracing elements along the length of each row. If desired, some bracing ribs like rib 139 shown in FIG. 18 might be used to strengthen the downwardly depending walls 138 of upper tray-forming member 121. Such ribs would also effect the degree of stackability of the upper tray-forming member 121, but some stackability would remain.

Figure 18:
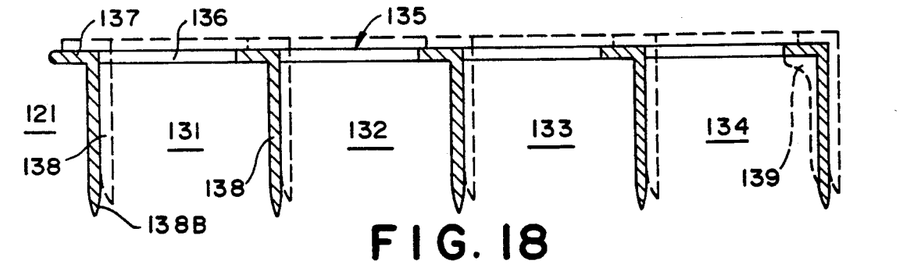
FIG. 18 is a section view of an upper tray-forming member taken along lines 18—18 in FIG. 16.
Figure 19:
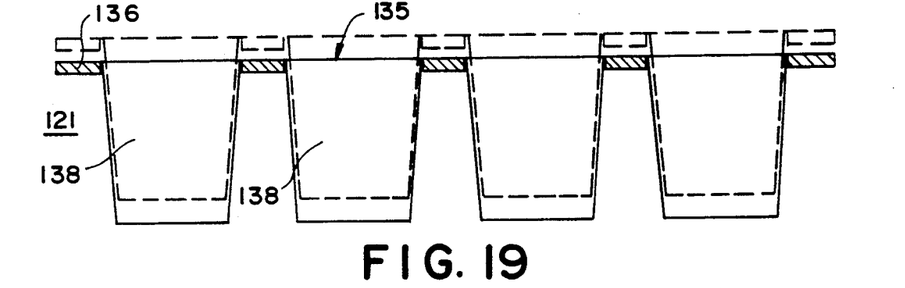
FIG. 19 is a section view of an upper tray-forming member taken along the liens 19—19 in FIG. 16.
Figure 20:
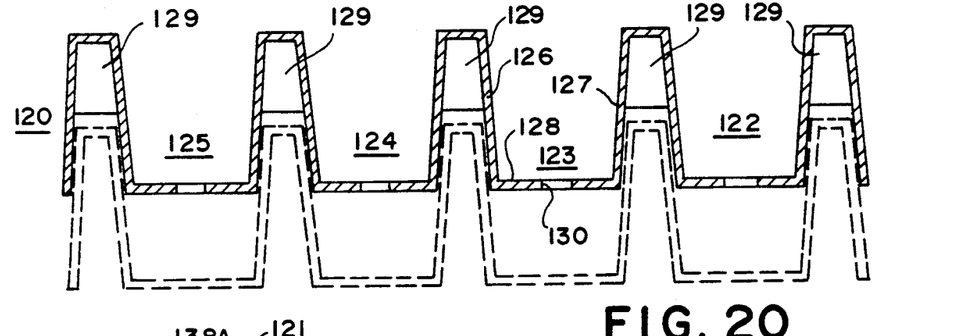
FIG. 20 is a section view of a lower tray-forming member taken along the lines 20—20 of FIG. 16.

Using the form of upper tray-forming member 121 shown in the two different cross section views in FIGS. 18 and 19, the upper tray-forming member units can be stacked as shown in dotted lines. As shown in FIG. 18, the units gradually build up an offset as they are stacked, if the stacking is continued in the manner shown. It should also be apparent that the orientation of the stacking could be reversed from one unit to the next and then a staggered pattern of offsets would avoid a "leaning tower" effect. It should also be apparent that the number of units which can be stacked up depends on the size of the apertures 140 relative to the thickness of the walls 138. It should also be apparent that, if stacking of the upper tray-forming member 121 and lower tray-forming member 120 is not required, the partial cell-forming walls 138 could be rectangular and the vertical walls 126 and 127 could be straight up and down rather than angled or tapered from top to bottom.

Figure 21:
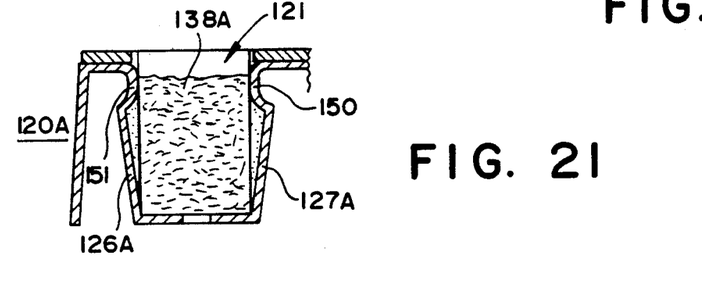
FIG. 21 is a section view of an alternative embodiment of upper and lower tray-forming members in accordance with this invention.

FIG. 21 illustrates an alternative form of side wall structures 126A and 127A of lower tray-forming member 120A. In this embodiment, a lip 150, 151 is formed at an upper portion of the side wall structures to provide a plug restraining lip that tends to hold the transplant plug in place when the upper tray-forming member 121 is removed. Without this lip it may be necessary to vibrate the frame 135 back and forth to loosen the walls 138 from the plug before raising upper tray-forming member 121 so that the plugs will not be carried out of the cells by this operation.

Referring to FIGS. 16 and 17, it can be seen that there are various approaches that can be taken to filling the transplant propagation tray apparatus and forming the individual cells to produce individual plugs into which seeds can be planted. One approach involves placing the upper tray-forming member 121 into mated position with the lower tray-forming member 120 and then filling the already formed cells with the transplant propagation medium. If needed, the unit can be vibrated to make sure that the medium is distributed throughout the cell, including the region under the overhanging frame members 137. Compression of the plugs before or after drilling a seed into the individual cells can be done by tamping through the apertures 140 one at a time or simultaneously with an appropriate soil tamping device.

Another approach would involve placing the lower tray-forming member 120 into a frame that closes the ends of the rows 122-125 and then filling the rows with transplant propagation medium. Thereafter the upper tray-forming member 121 may be mated with the lower tray-forming member 120 by pushing the wall sections 138 into the rows of the lower tray-forming member 120. Tapered end portions 138B as shown in FIG. 18 could be provided to facilitate the placement of the upper tray-forming member 121. This placement step would tend to compact or compress the medium in each of the cells. Further tamping of the medium can be performed if needed and then the seed hole can be drilled and the remainder of the typical planting operation completed.

From the view of this embodiment in FIG. 16, it should be apparent that there are a number of ways that the transplant plugs can be removed from the lower tray-forming member 120 after the upper tray-forming member 121 has been removed. For example, the apparatus of FIG. 14 could be adapted such that the conveyer belt 80 is positioned such that its surface is opposite to the lower tray-forming member 120 when it is lowered on platform 75. Then the pusher 82 could be repositioned to be at that level and thus available to push the transplant plugs out of the rows of the lower tray-forming member 120.

The plug transfer apparatus of FIGS. 9 and 10 could also be adapted to this alternative embodiment by using a plug transfer module 61 which loaded plugs onto the conveyer 21 from lower tray-forming member 120. A variety of other automated and semi-automated equipment for removing and transferring the plugs could also be fashioned.

It should be apparent that one of the main advantages of the embodiment of FIGS. 16 and 17 is that the plugs have vertical wall surfaces where they meet each other if pushed out of the rows of the lower tray-forming member 120. The individual plugs are thus likely to have their dirt disturbed in the process of removing them from the tray. If needed, the lower tray-forming member 120 can be made flexible enough to enable some stretching of the unit to separate the walls of the rows from the plugs to make it easier to remove the plugs.

Manufacturing Materials and Methods

It should be apparent that lower tray member 20 and upper tray member 21 may be fashioned from a variety of materials using a number of different manufacturing processes. For example, lower tray member could be fashioned as a metal or plastic extrusion with apertures 29 die cut therein. Lower tray member could also be formed from a long roll of sheet metal by passing it through various die stages to fold the metal into the desired shape, followed by die punching of the apertures 29. Other useful manufacturing technique would be plastic injection molding or plastic vacuum forming.

The method selected would be tailored to the characteristics desired for the lower tray member, e.g. whether it is a long term use item or disposable.

Upper tray member 20 could be made using virtually any of the same processes as described above but with a more delicate and complicated die cutting operation to remove the triangular shaped regions 39 from side wall sections and the square material from the bottom wall section. For large volume production, other more sophisticated methods, such as laser or electron beam machining could be used to cut out the shapes of upper tray member, especially if thin, vacuumed formed plastic material is used for a disposable product.

Figure 13:
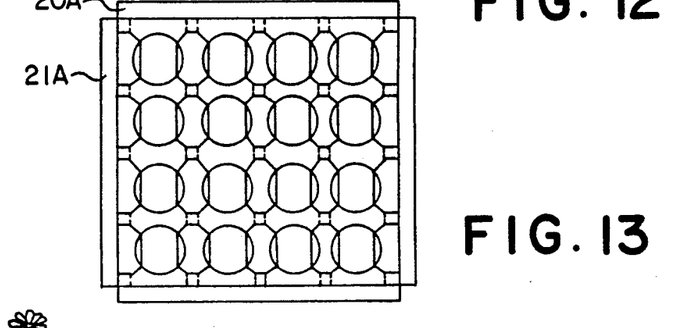
FIG. 13 is a top view of an assembled transplant propagation tray formed by assembling the upper and lower tray members depicted in FIGS. 10 and 11.

Manufacture of the alternative embodiment shown in FIGS. 11-13 will preferably involve some form of molding process for lower tray member 20A. A variety of metal or plastic forming methods could be used to produce upper tray member 21A.

Manufacture of the embodiment of FIGS. 16 and 17 can be done in various ways, including use of metal stamping and forming equipment or plastic injection molding equipment, depending on the requirements for the upper tray-forming member 121 and the lower tray-forming member 120. In particular, the upper tray-forming member 121 could be formed by stamping a flat sheet of metal to form tabs that will become the depending walls 138 and then using a metal forming stage to bend these tabs into the final wall configuration. Plastic injection molding of this part is also readily feasible. Lower tray-forming member 120 could be formed from a single sheet of metal bent into shape or by extruding aluminum into the desired shape. The strengthening ribs could be added later if metal forming or extruding is used. If plastic injection molding were used, the ribs can be formed integrally with the wall structure of the unit.

While various embodiments of this invention has been described above, it should be apparent that persons of skill in this art could make numerous modifications without departing from the scope of the invention as claimed in the following claims.

What is claimed is:

1. Apparatus for transplant propagation comprising a unitary lower tray member and a separate unitary upper tray member carried on said lower tray member and cooperatively forming a regular two dimensional array of transplant plug cells arranged as separate but interconnected rows and columns adapted to receive a transplant medium for growing of seedling in each of said transplant plugs thereby formed in said transplant plug cells, said upper tray member being removable from said lower tray to carry simultaneously all of said rows and columns of transplant plugs out of said two dimensional array of cells and said upper tray member consisting of parallel rows partial cell-forming sidewall portions joined at lower edges by bottom wall portions such that each of said transplant plugs is supported by said upper tray member solely on two of its opposing sides and bottom.

2. Apparatus as claimed in claim 1, wherein said lower tray member comprises a complete transplant propagation tray itself defining a regular two dimensional array of rows and columns of transplant plug cells, and said upper tray member has said partial cell-forming sidewall portions and said bottom wall portions formed to allow said upper tray member to nest in said lower tray member and thereby effectively to form portions of the side and bottom walls of said transplant plug cells.

3. Apparatus as claimed in claim 1, wherein said upper and lower tray members each comprises a plurality of parallel channels with each channel formed by a pair of vertical side wall sections and a bottom wall section joining lower edges of said vertical side wall sections, adjacent vertical side wall sections of said tray members being joined together and forming a structural element; said channels in said lower and upper tray members being positioned transverse to each other when assembled together; said channels in said lower tray member being substantially continuous from end to end thereof; said vertical side wall sections and said bottom wall section of said upper tray member being discontinuous from end to end and defining openings corresponding in geometrical shape to said structural element formed by vertical side wall sections of said lower tray member such that said upper tray member nests on said lower tray member and sections of said vertical side walls of each of said upper and lower tray members form the complete side walls of said array of transplant plug cells.

4. Apparatus as claimed in claim 3, wherein said bottom wall section of said upper tray member is positioned substantially adjacent to said bottom wall section of said lower tray when said tray members are assembled together, and both of said bottom wall sections have apertures defined therein at cooperative locations to form a drainage aperture in the bottom of each of said transplant plug cells defined thereby.

5. Apparatus as claimed in claim 3, wherein said structural member defined by said side walls of said lower tray member is a solid structural member to provide rigidity to said lower tray member.

6. Apparatus as claimed in claim 3, wherein a plurality of water transmission channels are formed between adjacent vertical side walls of said lower tray member and extend from one end of said lower tray member to the other;

and said apparatus further comprises:
a first header means mounted in a liquid sealed relationship over one end of said lower tray member to permit water flow between the ends of said water transmission channels thereat;
a second header means mounted in a liquid sealed relation over the opposite end of said lower tray member to permit water flow between the ends of said water transmission channels thereat;
heater means mounted in one of said header means; and
temperature sensor and control means for operating said heater means to control the temperature of water in said first and second header means and said water transmission channels.

7. Apparatus as claimed in claim 6, wherein one of said first and second header means includes a first header section communicating with a first group of said water transmission channels, a second header section communicating with a second group of said water transmission channels, and a water pump for pumping water between said first and second header sections to produce a circulation of water through each of said water transmission channels.

8. Apparatus as claimed in claim 3, wherein a plurality of water transmission channels are formed between adjacent vertical side walls of said lower tray member and extend from one end of said lower member to the other;

and said apparatus further comprises:

a plurality of water emitter means carried on each of said transmission channels for communicating water from said channel through said side walls of said lower tray member to provide water to transplant plugs carried in each of said cells.

9. Apparatus as claimed in claim 1, wherein said lower tray member is mounted in a stationary position and comprises a plurality of parallel channels with each channel formed by a pair of opposite, sloped vertical side wall sections and a bottom wall section joining lower edges of said vertical side wall sections, adjacent vertical side wall sections of said tray members being joined together and forming a substantially triangular structural element; said upper tray member comprises an endless flexible belt member carried on first and second guide rolls mounted adjacent opposite ends of said channels in said lower tray member, said belt member having sloping vertical side wall sections and bottom wall sections cooperating with said side wall and bottom wall sections of said lower tray member to form said rectangular array of transplant cells for growing transplant plugs; and drive means is provided for driving said endless flexible belt member to carry rows of said transplant plugs to one end of said lower tray member for unloading from said upper tray member.

10. Apparatus as claimed in claim 3, wherein said lower tray member has a plurality of spaced openings formed in each of said substantially vertical side wall sections and having a configuration and spacing such that said openings are covered by wall portions of said upper tray member when said upper tray member nests on said lower tray member.

11. In transplant propagation and planting apparatus, in combination:
a plurality of transplant propagation trays each comprising a unitary lower tray member and a separate unitary upper tray member carried on said lower tray member and cooperatively forming a regular array of transplant plug cells for containing a transplant medium for growing of seedlings, said unitary upper tray member being removable from said unitary lower tray member to carry transplant plugs out of said array of cells;
a transplant plug conveyer for carrying individual ones of said transplant plugs away from a plug transfer station; and
a plug removal module positioned at said plug transfer station and comprising
first support means for supporting said upper tray member in a fixed position adjacent said transplant plug conveyer and independent of support of said lower tray member;
second support means for supporting said lower tray member in a vertically movable relation to said upper tray member and including means for moving said lower tray member from an initial position in which said lower tray member is nested with said upper tray member to a separated position in which said lower tray member is fully separated from transplant plugs supported on said upper tray member; and
plug pusher means adapted to be selectively positioned adjacent each row of transplant plugs carried on said upper tray member and having a pusher element operative to push said transplant plugs in said row one at a time onto said transplant plug conveyer.

12. Apparatus for transplant seedling propagation comprising a lower tray-forming member and a separate upper tray-forming member carried in removably mated relationship on said lower tray-forming member so as to form a complete seedling propagation tray, each of said lower tray-forming member and said upper tray-forming member having a plurality of rows of partial cell-forming wall structures adapted to mate together and thereby combining together to form the completed walls of a regular two-dimensional array of separate cells for containing transplant plugs, each of said separate cells being adapted to be filled with a transplant propagation medium for growing of a seedling from a seed deposited therein and thereby forming a transplant plug, said separate upper tray-forming member being separable from said lower tray-forming member such that each and every one of said transplant plugs is thereafter carried solely on a prearranged one of said upper tray-forming member and said lower tray-forming member and supported only by said partial cell forming wall structures thereof such that said transplant plugs may thereafter be easily removed therefrom for transplanting.

13. Apparatus as claimed in claim 12, wherein said lower tray-forming member has a pair of side walls and a bottom wall in each of said rows of partial cell-forming wall structures and said upper tray-forming member has only side wall structures forming said rows of partial cell-forming wall structures, said upper tray-forming member being separable from said lower tray-forming member and thereby leaving said transplant plugs supported on said lower tray-forming member.

14. Apparatus as claimed in claim 12, wherein each of said lower tray-forming member and said upper tray-forming member has associate rows of opposing side and bottom wall structures as said partial cell forming wall structures, said upper tray-forming member thereby being adapted to carry all of said transplant plugs out of said tray when said upper tray-forming member is separated from said lower tray-forming member.

15. Apparatus for transplant seedling propagation comprising a lower tray member and a separate upper tray member carried in removably mated relationship on said lower tray member so as to form a complete seedling propagation tray consisting of a regular two-dimensional array of transplant propagation cells arranged as separate but interconnected rows and columns, each of said lower tray member and said upper tray member having a plurality of rows of partial cell-forming wall structures adapted to mate together and thereby combining together to form the completed walls of said regular two-dimensional array of transplant propagation cells, each of said transplant propagation cells being adapted to be filled with a transplant propagation medium for growing of a seedling from a seed deposited therein and thereby forming a transplant plug, said separate upper tray member being separable from said lower tray member after growing of said seedlings for simultaneously removing and carrying each of said transplant plugs out of said two-dimensional array of separate cells such that each and every one of said transplant plugs is thereafter supported only by said partial cell-forming wall structures of said upper tray member and may thus be easily removed from said upper tray member for transplanting.

16. Apparatus as claimed in claim 15, wherein said lower tray member and said separate upper tray member each comprises a plurality of parallel channels with each channel formed by a pair of sloping vertical side wall sections and a bottom wall section joining lower edges of said sloping vertical side wall sections, adjacent ones of said sloping vertical side wall sections begin joined along an upper edge portion thereof and forming a unitary structural element; said parallel channels in said lower tray member and said separate upper tray member being oriented transverse to each other when said separate upper tray member is mated with said lower tray member; said sloping vertical side wall sections and said bottom wall section of said separate upper tray member being discontinuous from one end of said channel to the other end thereof and defining openings corresponding in geometrical shape to said structural element formed by said sloping vertical side wall sections of said lower tray member such that when said separate upper tray member is removably mated with said lower tray member sections of said sloping vertical side walls of said separate upper tray member and of said lower tray member cooperatively form four complete side walls of each of said separate cells in said two-dimensional array.

17. Apparatus as claimed in claim 16, wherein said bottom wall section of each of said parallel channels in said separate upper tray member is positioned substantially adjacent to said bottom wall section of each of said parallel channels in said lower tray member when said separate upper tray member is mounted on said lower tray member, and both of said bottom wall sections have apertures defined therein at prearranged and spatially coincident locations to form a drainage aperture for each of said transplant plugs formed in said two-dimensional array of separate cells.

18. Apparatus as claimed in claim 16, wherein said structural element defined by said sloping vertical side wall sections of said lower tray member is a solid, continuous structural member to provide rigidity to said lower tray member.

19. Apparatus as claimed in claim 16, wherein a plurality of water transmission channels are formed between adjacent side walls of said lower tray member and extend from one end of said lower tray member to the other;
and said apparatus further comprises:
a first header means mounted in a liquid sealed relationship over one end of said lower tray member to permit water flow between the ends of said water transmission channels thereat;
a second header means mounted in a liquid sealed relation over the opposite end of said lower tray member to permit water flow between the ends of said water transmission channels thereat;
heater means mounted in one of said header means; and temperature sensor and control means for operating said heater means to control the temperature of water in said first and second header means and said water transmission channels.

20. Apparatus as claimed in claim 19, wherein one of said first and second header means includes a first header section communicating with a first group of said water transmission channels, a second header section communicating with a second group of said water transmission channels, and a water pump for pumping water between said first and second header sections to produce a circulation of water through each of said water transmission channels.

21. Apparatus as claimed in claim 16, wherein a plurality of water transmission channels are formed between adjacent vertical side walls of said lower tray member and extend from one end of said lower tray member to the other;
and said apparatus further comprises:
a plurality of water emitter means carried on each of said water transmission channels for communicating water from said channel though said side walls of said lower tray member to provide water to transplant plugs carried in each of said cells.

22. In transplant propagation and planting apparatus, in combination:
a plurality of transplant propagation trays each a lower tray member and a separate upper tray member carried in removably mated relationship on said lower tray member so as to form a complete seedling propagation tray consisting of a regular two-dimensional array of transplant propagation cells arranged as separate but interconnected rows and columns, each of said lower tray member and said upper tray member having a plurality of rows of partial cell-forming wall structures adapted to mate together and thereby combining together to form the completed walls of said regular two-dimensional array of transplant propagation cells, each of said transplant propagation cells being adapted to be filled with a transplant propagation medium for growing of a seedling from a seed deposited therein and thereby forming a transplant plug, said separate upper tray member being separable from said lower tray member after growing of said seedlings for simultaneously removing and carrying each of said transplant plugs out of said two-dimensional array of separate cells such that each and every one of said transplant plugs is thereafter supported only by said partial cell-forming wall structures of said upper tray member and may thus be easily removed from said upper tray member for transplanting:
a tray conveyer module, including a tray conveyor for receiving a sequence of consecutive ones of said upper tray members after being separated from said lower tray members and thus carrying mature transplant plugs and for carrying each of said upper tray members in sequence to a plug transfer station, and a plug removal means positioned at said plug transfer station for removing said transplant plugs from said upper tray member one row at a time; and
a plug transfer module positioned at said plug transfer station and adapted to receive each row of transplant plugs from an upper tray member positioned at said plug transfer location and to carry each of said transplant plugs to a plug delivery location station.

23. Apparatus as claimed in claim 22, wherein
said plug removal means comprises transport means carrying said upper tray member around a bending radius and thereby expanding the cell walls thereof and releasing each transplant plug in a row of cells to drop out of said cells;
said plug transfer module comprises a cage member rotating in synchronism with the travel of said upper tray member around said radius and having a plurality of plug receiving finger elements radially extending from a central hub and adapted to catch each plug in each row as it drops from said cells and thereafter to carry said plugs to a delivery location, and a plug delivery means adapted to receive said transplant plugs at said delivery station for delivery to a plug planting module.

24. Apparatus as claimed in claim 22, further:

a tray loading module positioned adjacent said tray conveyor for placing a sequence of said upper tray members loaded with transplant plugs onto said tray conveyor at said tray loading station; and a tray member guide means operative positioned relative to said tray conveyor for guiding said upper tray modules as they are carried from said tray loading station to said plug transfer station.

25. Apparatus as claimed in claim 15, wherein said lower tray member is mounted on a stationary support member and comprises a plurality of parallel channels with each channel formed by a pair of opposite, sloped vertical side wall sections and a bottom wall section joining lower edges of said vertical side wall sections, adjacent vertical side wall sections of said tray members being joined together and forming a substantially triangular structural element;

said upper tray member comprises an endless flexible belt member carried on first and second guide rolls mounted adjacent opposite ends of said parallel channels in said lower tray member, said belt member having sloping vertical side wall sections and bottom wall sections cooperating with said side wall and bottom wall sections of said lower tray member to form said rectangular array of transplant cells for growing transplant plugs; and drive means is provided for driving said endless flexible belt member to carry rows of said transplant plugs to one end of said lower tray member for unloading from said upper tray member.

26. Apparatus as claimed in claim 15, wherein said lower tray member has a plurality of spaced openings formed in each of said substantially vertical side wall sections and having a configuration and spacing such that said openings are covered by wall portions of said upper tray member when said upper tray member nest on said lower tray member.

27. Apparatus as claimed in claim 15, further comprising a transplant plug conveyer for carrying individual ones of said transplant plugs away from a plug transfer station; and a plug removal module positioned at said plug transfer station and comprising first support means for supporting said upper tray member in a fixed position adjacent said transplant plug conveyer and independent of said lower tray member;

second support means for supporting said lower tray member in a vertically movable relation to said upper tray member and including means for moving said lower tray member from an initial position in which said lower tray member is mated with said upper tray member to a second position in which said lower tray member is fully separated from transplant plugs supported on said upper tray member; and plug pusher means adapted to be selectively positioned adjacent each row of transplant plugs carried on said upper tray member and having a pusher element operative to push said transplant plugs in said row one at a time onto said transplant plug conveyer.

28. Apparatus as claimed in claim 12, further comprising a transplant plug conveyer for carrying individual ones of said transplant plugs away from a plug transfer station; and a plug removal module positioned at said plug transfer station and comprising first an second support means for individually and independently supporting said upper tray-forming member and said lower tray-forming member in a position adjacent said transplant plug conveyor;

tray separator means acting on a prearranged one of said first and second support means for moving said prearranged one of said first and second support means vertically away from the other one of said first and second support means and thereby to separate said upper tray-forming member from said lower tray-forming member such that said transplant plugs are thereafter carried solely said prearranged one of said upper tray-forming member and said lower tray-forming member; and plug pusher means adapted to be selectively and sequentially positioned adjacent each row of transplant plugs carried on said prearranged one of said upper tray-forming member and said lower tray-forming member and having a pusher element operative to push said transplant plugs in each said row one at a time onto said transplant plug conveyer.

* * * * *